United States Patent
Kim et al.

(10) Patent No.: US 8,086,102 B2
(45) Date of Patent: Dec. 27, 2011

(54) PASSIVE OPTICAL NETWORK BASED ON REFLECTIVE SEMICONDUCTOR OPTICAL AMPLIFIER

(75) Inventors: Byoung-Whi Kim, Daejeon (KR); Mahn-Yong Park, Gwangju (KR); Seung-Hyun Cho, Daejeon (KR); Woo-Ram Lee, Daejeon (KR)

(73) Assignee: Electronics and Telecommunications Research Institute (KR)

( * ) Notice: Subject to any disclaimer, the term of this patent is extended or adjusted under 35 U.S.C. 154(b) by 487 days.

(21) Appl. No.: 12/226,699

(22) PCT Filed: May 8, 2007

(86) PCT No.: PCT/KR2007/002255
§ 371 (c)(1),
(2), (4) Date: Feb. 13, 2009

(87) PCT Pub. No.: WO2007/133000
PCT Pub. Date: Nov. 22, 2007

(65) Prior Publication Data
US 2009/0220230 A1  Sep. 3, 2009

(30) Foreign Application Priority Data

May 11, 2006 (KR) .................. 10-2006-0042394
Sep. 29, 2006 (KR) .................. 10-2006-0096418

(51) Int. Cl.
*H04B 10/20* (2006.01)

(52) U.S. Cl. ..................... 398/67; 398/168
(58) Field of Classification Search ............. 398/66–72, 398/168
See application file for complete search history.

(56) References Cited

U.S. PATENT DOCUMENTS

| 5,559,624 | A | 9/1996 | Darcie et al. |
| 2006/0115269 | A1* | 6/2006 | Shin et al. ............. 398/71 |
| 2010/0214651 | A1* | 8/2010 | Kim et al. ............. 359/344 |

FOREIGN PATENT DOCUMENTS

| JP | 2005-333653 | 12/2005 |
| JP | 2006-054874 | 2/2006 |
| JP | 2006-067603 | 3/2006 |
| JP | 2006-262020 | 9/2006 |

(Continued)

OTHER PUBLICATIONS

Jeung-Mo Kang et al., A Novel Hybrid WDM-SCM-PON Sharing Wavelength for Up-and Down-Link Using Reflective Semiconductor Optical Amplifier, IEEE Photonics Technology Letters, Feb. 1, 2006, vol. 18, No. 3.

(Continued)

*Primary Examiner* — Leslie Pascal
(74) *Attorney, Agent, or Firm* — Blakely, Sokoloff, Taylor & Zafman

(57) ABSTRACT

Provided is a passive optical network (PON) based on a reflective semiconductor optical amplifier (RSOA). In the PON, seed-light-injection RSOAs are used in an optical line terminal (OLT) to achieve the color-less management of the wavelengths of OLT optic sources, and wavelength reuse RSOAs are used to achieve the color-less management of the wavelengths of ONTs. Therefore, problems related to ONT wavelength management can be eliminated by the wavelength reuse RSOAs, and problems related to OLT wavelength management can be eliminated by the seed-light-injection RSOAs.

20 Claims, 6 Drawing Sheets

FOREIGN PATENT DOCUMENTS

| | | |
|---|---|---|
| KR | 1020040056828 A | 7/2004 |
| KR | 1020050013384 A | 2/2005 |
| KR | 1020050032286 A | 4/2005 |
| KR | 1020050055098 A | 6/2005 |
| KR | 1020050073381 A | 7/2005 |
| KR | 1020050117754 A | 12/2005 |
| KR | 1020060037573 A | 5/2006 |
| KR | 1020060088268 A | 8/2006 |
| KR | 1020060091988 A | 8/2006 |
| KR | 1020060100127 A | 9/2006 |

OTHER PUBLICATIONS

Soo-Jin Park et al., WDM-PON system based on the laser lignt infected reflective semiconductor optical amplifier, Optical Fiber Technology 12 (2006) 162-169, available online Sep. 23, 2005, Elsevier Inc.

Dong Jae Shin et al., Hybrid WDM/TDM-PON With Wavelength-Selection-Free Transmitters, Journal of Lightwave Technology, vol. 23, No. 1, Jan. 2005.

\* cited by examiner

PASSIVE OPTICAL NETWORK BASED ON REFLECTIVE SEMICONDUCTOR OPTICAL AMPLIFIER

The present patent appliaition is a Utility claiming the benefit of Application No. PCT/KR2007/002255, filed May 8, 2007.

CROSS-REFERENCE TO RELATED PATENT APPLICATION

This application claims the benefits of Korean Patent Application No. 10-2006-0042394, filed on May 11, 2006, and Korean Patent Application No. 10-2006-0096418, filed on Sep. 29, 2006, in the Korean Intellectual Property Office, the disclosures of which are incorporated herein in their entirety by reference.

BACKGROUND OF THE INVENTION

1. Field of the Invention

The present invention relates to an optical communication system, and more particularly, to a wavelength division multiplexing-passive optical network (WDM-PON).

2. Description of the Related Art

Fiber To The Home (FTTH) technology is being actively studied and developed all over the world for connecting a home to a telephone office using an optical fiber transmission line so as to provide integrated services including voice calls, data services, and broadcasts. The use of FTTH technology will dramatically increase in the next several years.

It is important, in terms of FTTH technology, to develop optical signal transmission methods for constructing cost effective optical networks at a high productivity. Optical networks can be classified into passive optical networks (PONs) and active optical networks (AONs). Recent PON systems include asynchronous transfer mode-passive optical network (ATM-PON), broadband-passive optical network (B-PON), gigabit-passive optical network (G-PON), and Ethernet-passive optical network (E-PON) systems. In recent AONs, local area networks including Ethernet switches are connected using optical transmission lines.

In wavelength division multiplexing (WDM) based FTTH networks (i.e., WDM-PONs), each subscriber is assigned a particular wavelength and communicates with a central office (CO) or an optical line terminal (OLT) using the assigned wavelength. Therefore, independent, high data-rate, high-security services can be provided to subscribers. Furthermore, unlike time division multiple access-passive optical networks (TDMA-PONs), modulation and demodulation of optical signals are individually performed for each subscriber, so that optic sources having a low modulation speed and power can be used together with optical receivers having a narrow bandwidth.

However, in a WDM-PON, a pair of optical transmitter/receiver modules is required for each subscriber. That is, it takes significant costs to construct a WDM-PON as compared with existing optical networks since optical transmitter/receiver modules should be installed in a subscriber premises and a central office. Moreover, since optic sources having particular wavelengths are required in proportion to the number of subscribers, it is expensive to construct a WDM-PON. In addition, spare optic sources having different wavelengths should be stored for respective subscribers so as to replace broken optic sources. This can be a great difficulty for a service provider in terms of management of wavelengths. Therefore, there is a need for inexpensive WDM-PON optic sources. Furthermore, it is necessary to provide a wavelength-independent optic source for subscribers so as to realize a cost-effective WDM-PON.

Meanwhile, management of wavelengths of optical network terminals (ONTs) is traditionally considered to be important. However, in a WDM-PON that recent service providers want, wavelengths of downstream optic sources of a central office should be easily managed as well as wavelengths of optical network terminals (ONTs) that are easily managed. That is, in a conventional WDM-PON based on a reflective semiconductor optical amplifier (RSOA), identical ONTs are used regardless of wavelengths assigned for the ONTs so as to solve wavelength management problems of the ONTs. However, more recent service providers want a WDM-PON designed to eliminate wavelength management problems of a central office as well as ONTs so that a network can be economically and stably managed.

Specifically, in a WDM-PON, a central office communicates with subscribers using different wavelengths for different subscribers. Therefore, the number of subscribers to the WDM-PON is limited since available wavelengths are limited. Although the number of subscribers to the WDM-PON can be increased by increasing the number of ports of an optical multiplexer (MUX) and demultiplexer (DMUX) and the number of single-mode optic sources (requiring wavelength control) of the central office, this method is uneconomical and also has a limitation in terms of increasing the number of subscribers. That is, wavelengths of a central office as well as ONTs should be efficiently used for more efficient optical communications.

Meanwhile, although data can be transmitted at 1 Gbps or at a higher rate using each wavelength, the high data transmission rate is not fully used since appropriate contents are not yet developed. That is, there is a need for a method of making more efficient use of wavelengths.

SUMMARY OF THE INVENTION

The present invention provides a reflective semiconductor optical amplifier (RSOA) based passive optical network (PON) that is designed for optimal management of wavelengths of an optical line terminal (OLT) by employing new optic sources.

The present invention also provides a hybrid-PON (hereinafter, referred to as a WDM/Ethernet (WE)-PON) using both wavelength division multiplexing (WDM) and time division multiple access (TDMA) communication schemes.

The present invention further provides a WE-PON designed to operate at a sufficient optical output power level for improving power budget and reliability.

According to an aspect of the present invention, there is provided a PON based on an RSOA for optimizing wavelength management of an OLT and an ONT (optical network terminal), the PON including: an OLT comprising seed-light-injection RSOAs as optic sources for transmitting downstream signals and first receivers receiving upstream signals; ONTs comprising second receivers receiving the downstream signals and RSOAs transmitting upstream signals using the downstream signals; and an RN (remote node) relaying signals between the OLT and the ONTs.

The seed-light-injection RSOAs may receive seed light from UCLs (utility-cooled lasers) based on a TO-CAN type DFB-LD (distributed feedback laser diode). Light output from the UCLs may be multiplexed by an optical MUX (multiplexer) and may be input to the respective seed-light-injection RSOAs through a seed-light circulator and an optical DMUX (demultiplexer) included in the OLT. Meanwhile, the light output from the UCLs may be distributed by an optical splitter installed in front of the optical MUX, such that at least two OLTs share the light output.

The OLT may further include an optical MUX multiplexing downstream signals from the seed-light-injection RSOAs and an optical DMUX demultiplexing upstream signals from the ONTs to the first receivers, and the RN comprises a circulator separating upstream and downstream signals and an optical MUX/DMUX, wherein upstream and downstream signals may be transmitted between the OLT and the RN, through upstream and downstream optical fiber lines, respectively. Alternatively, the OLT may further include an optical MUX, an optical DMUX, and a circulator, wherein the OLT and the RN may communicate with each other using a single optical fiber line.

The RN may include: an optical MUX/DMUX; and TDMA (time division multiple access) optical splitters connected between ports of the optical MUX/DMUX and the ONTs. When the optical splitters have a splitting ratio of 1:M, the number of the ONTs increases by M times owing to the optical splitters.

When the RN includes the TDMA optical splitters, the first receivers of the OLT may be burst-mode receivers each capable of receiving the upstream signals regardless of the different distances between the ONTs and the RN.

The OLT may further include an output optical amplifier increasing output power of an optical MUX that multiplexes downstream signals from the seed-light-injection RSOAs, and a reception optical amplifier increasing power of input signals of the optical DMUX that demultiplexes upstream signals from the ONTs to the first receivers. The output optical amplifier may be an EDFA (erbium doped fiber amplifier) having a predetermined saturation output power, and the reception optical amplifier may be an SOA (semiconductor optical amplifier) having a predetermined saturation output power and linear gain.

In the PON based on the RSOA, the seed-light-injection RSOAs are used as optic sources in the OLT, so that wavelengths of the downstream optic sources can be economically managed due to the colorless nature of the RSOAs. Moreover, the RSOA based PON uses the TDMA communication scheme as well as the WDM communication scheme, so that the number of subscribers can be increased by M times. In addition, when the number of ONTs is increased, optical amplifiers can be included in the OLT so as to ensure sufficient optical power for transmitting upstream and downstream signals and increase network reliability. Therefore, according to the present invention, the difficulty in managing the wavelengths in use can be efficiently taken out, and thus problems of conventional WDM-PONs related to the high equipment cost per user and difficulty in wavelength management can be solved.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

Figure 1:
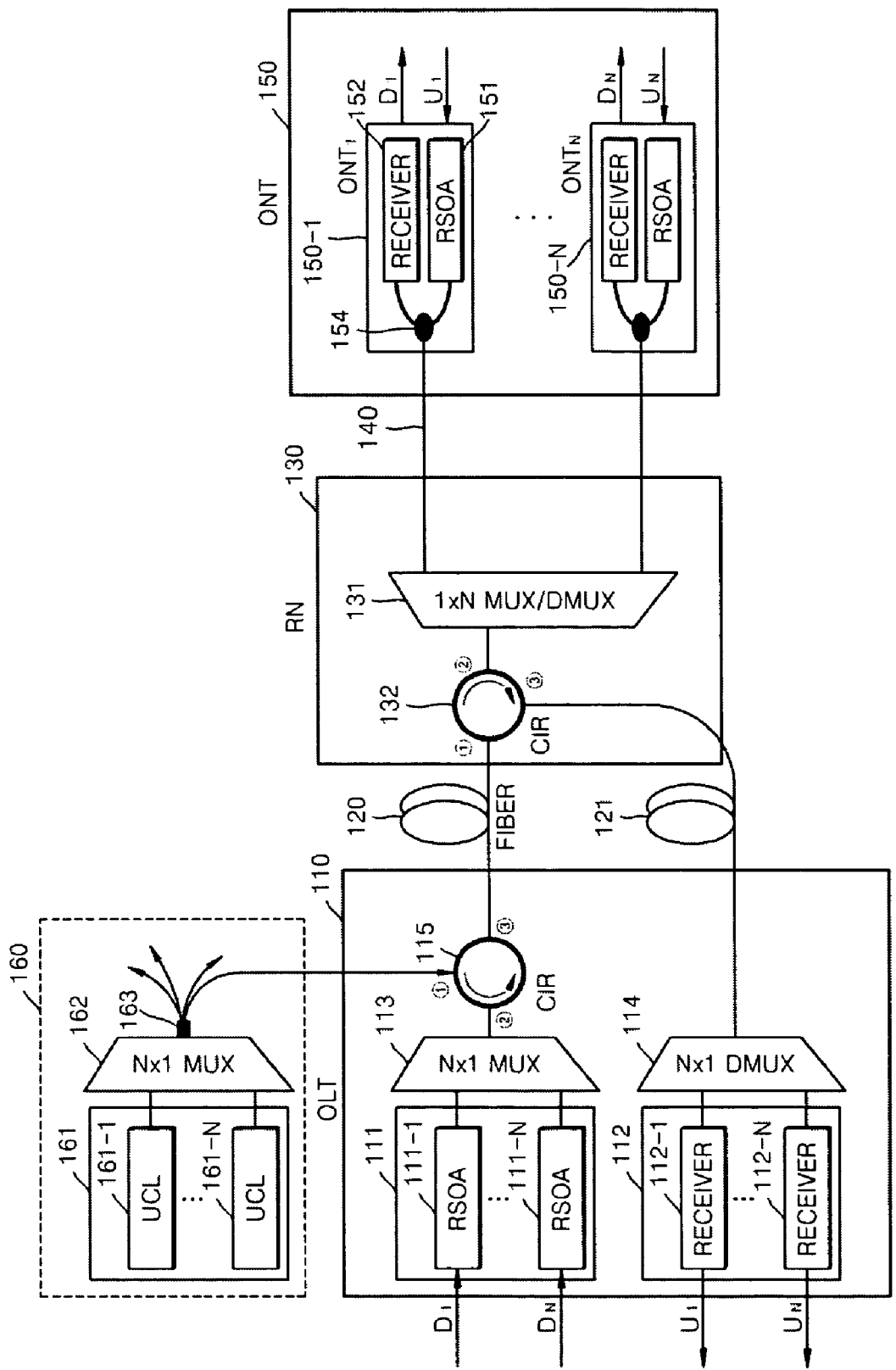
FIG. 1 is a schematic block diagram illustrating a wavelength division multiplexing-passive optical network (WDM-PON) using a seed-light-injection reflective semiconductor optical amplifier (RSOA) as a downstream optic source according to an embodiment of the present invention.

The present invention will now be described more fully with reference to the accompanying drawings, in which exemplary embodiments of the invention are shown. In the drawings, the thicknesses of layers and regions are exaggerated for clarity, and like reference numerals denote like elements. The invention may be embodied in many different forms and should not be construed as being limited to the embodiments set forth herein; rather, these embodiments are provided so that this disclosure will be thorough and complete, and will fully convey the concept of the invention to those of ordinary skill in the art.

FIG. 1 is a schematic block diagram illustrating a wavelength division multiplexing-passive optical network (WDM-PON) using a seed-light-injection type reflective semiconductor optical amplifier (RSOA) as a downstream optic source and a wavelength reuse type RSOA as an upstream optic source according to an embodiment of the present invention.

Referring to FIG. 1, the WDM-PON according to the current embodiment includes a central office or an optical line terminal (OLT) 110, an optical network terminal (ONT) 150, and a remote node (RN) 130. The OLT 110 transmits a downstream signal and receives an upstream signal, the ONT 150 receives a downstream signal and transmits an upstream signal, and the RN 130 relays signals between the OLT 110 and the ONT 150. Meanwhile, downstream and upstream optical fiber lines 120 and 121 connect the OLT 110 and RN 130, and optical fiber lines 140 connect the RN 130 and the ONT 150.

The OLT 110 includes a seed-light-injection RSOA array 111, a first receiver array 112, an optical multiplexer (MUX) 113, and an optical demultiplexer (DMUX) 114. The seed-light-injection RSOA array 111 includes individual or integrated seed-light-injection RSOAs 111-1 through 111-N, and the first receiver array 112 includes individual or integrated first receivers 112-1 through 112-N. The MUX 113 multiplexes downstream signals from the seed-light-injection RSOA array 111, and the DMUX 114 demultiplexes upstream signals and distributes them to the first receivers 112-1 through 112-N.

The seed-light-injection RSOAs 111-1 through 111-N of the RSOA array 111 respectively modulate N downstream signals $D_1$ through $D_N$ using light having N wavelengths so as to transmit the N downstream signals $D_1$ through $D_N$ to N ONTs 150. The first receivers 112-1 through 112-N can be formed using a P-I-N photodiode (PIN-PD) or an avalanche photodiode (APD) and receives upstream signals $U_1$ through $U_N$ from the ONT 150. The MUX 113 transmits downstream signals by multiplexing N single-mode outputs of the ROSAS 111-1 THROUGH 111-N into the downstream optical fiber line 120.

Meanwhile, the seed-light-injection RSOAs 111-1 through 111-N can be matched with the first receivers 112-1 through 112-N, respectively, and each pair can be installed in the same housing as a module. In this case, N transmitter/receiver modules are included in the OLT 110, and each of the N transmitter/receiver modules includes a seed-light-injection RSOA and a receiver.

A distribute feedback laser diode (DFB-LD) optic source array 161 of a seed optic source unit 160 generates light for the ROSAs 111-1 through 111-N. In detail, DFB-LD optic sources 161-1 through 161-N (hereinafter, each of the DFB-LD optic sources 161-1 through 161-N will be referred to as a DFB-LD 161-N) of the DFB-LD optic source array 161 emit a plurality of wavelengths, and the wavelengths are multiplexed by an optical MUX 162 into the OLT 110. Then, the multiplexed wavelengths are demultiplexed by a seed-light circulator 115 and the MUX 113 of the OLT 110 into the respective RSOAs 111-1 through 111-N. Then, the ROSAs 111-1 through 111-N output the same wavelengths as the wavelengths input.

Meanwhile, light output from the DFB-LD optic source array 161 can be shared with other OLTs by distributing the light using an optical splitter 163. In this case, the DFB-LD optic source array can be economically used. Furthermore, an less-expensive TO-CAN type dense wavelength division multiplexing (DWDM) DFB-LD (i.e., a utility-cooled laser, UCL) as well as a more-expensive butterfly type DFB-LD can be used as the DFB-LD optic source 161-N. In the current embodiment, a more economical PON can be established using UCLs.

The RN 130 can include a circulator 132 and an optical MUX/DMUX 131. The circulator 132 separates downstream signals and upstream signals, and the MUX/DMUX 131 demultiplexes downstream signals into the ONT 150 and multiplexes upstream signals from the ONT 150. That is, multiplexed downstream signals transmitted to the MUX/DMUX 131 through the optical fiber line 120 and the circulator 132 are demultiplexed by the MUX/DMUX 131 according to the wavelengths of the signals and are transmitted to the ONT 150 through the optical fiber lines 140. The MUX/DMUX 131 can be formed of an arrayed waveguide grating (AWG) or thin film filter (TFT).

The ONT 150 includes $ONT_1$ 150-1 through $ONT_N$ 150-N. Each of the $ONT_1$ 150-1 through $ONT_N$ 150-N includes an RSOA 151, a second receiver 152, and a coupler 154. The coupler 154 divides optical power of a downstream signal received from the optical fiber line 140 into the RSOA 151 and the second receiver 152 in consideration of a power budget and a gain saturation input power of the RSOA 151. The second receiver 152 receives a downstream signal $D_i$ (where i ranges from 1 to N), and the RSOA 151 remodulates a received downstream optical signal by an upstream data and transmits the upstream signal $U_i$ (where i ranges from 1 to N) to the OLT 110.

Light modulated as upstream signals $U_i$ in RSOAs 151 are transmitted to the MUX/DMUX 131 of the RN through the optical fiber lines 140 and are multiplexed by the MUX/DMUX 131. Then, the multiplexed upstream signals $U_i$ are directed to the upstream optical fiber line 121 by the circulator 132 and are input to the OLT 110. In the OLT 110, the multiplexed upstream signals $U_i$ are demultiplexed into respective wavelength channels and are input to the first receivers 112-1 through 112-N. That is, finally, the first receivers 112-1 through 112-N receive the upstream signals $U_i$.

In the PON of the current embodiment, seed-light-injection RSOAs are used as optic sources of the OLT, and a DFB-LD optic source array is used to generate seed light for the RSOAs. Therefore, the inventory problem with the downstream wavelengths can be taken out. Furthermore, the PON can be constructed more economically by using UCLs for the DFB-LD optic source array.

Figure 2:
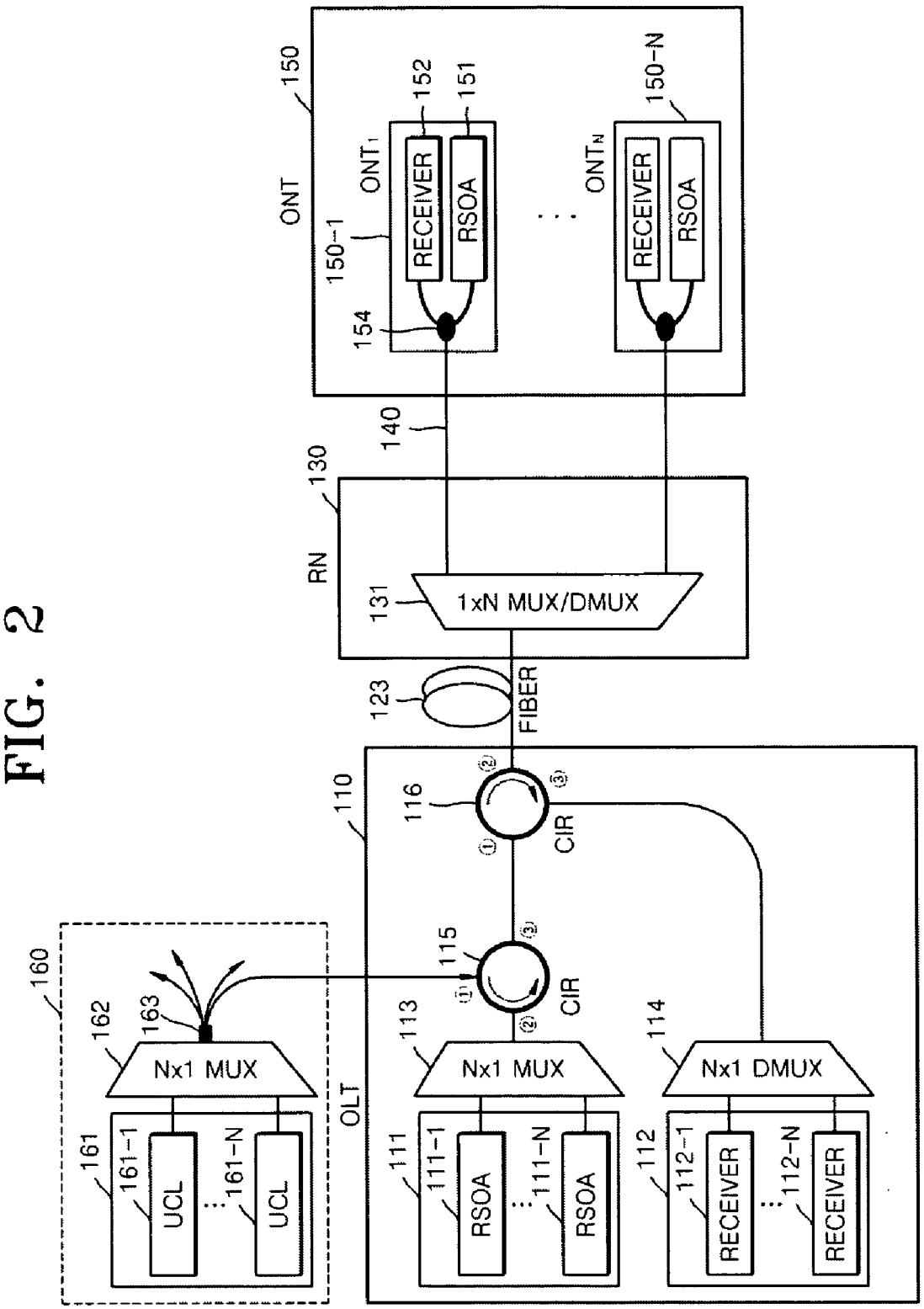
FIG. 2 is a schematic block diagram illustrating a PON having a structure similar to that of the WDM-PON illustrated in FIG. 1 except that only a single optical fiber line is used to connect a central office and a remote node (RN) according to another embodiment of the present invention.

FIG. 2 is a schematic block diagram illustrating a WDM-PON having a structure similar to that of the WDM-PON illustrated in FIG. 1 except that only a single optical fiber line is used to connect an OLT and an RN according to another embodiment of the present invention.

Referring to FIG. 2, the WDM-PON of the current embodiment has a structure similar to that of the WDM-PON of the embodiment illustrated in FIG. 1. However, the WDM-PON of the current embodiment uses a single optical line for both upstream and downstream transmissions for saving optical fiber lines. That is, instead of an RN 130, an OLT 110 includes a circulator 116 for separating a downstream signal and an upstream signal.

Signals are transmitted in the WDM-PON as follows. Downstream signals produced by modulating outputs of RSOAs 111-1 through 111-N are multiplexed by an optical MUX 113 and transmitted through an optical fiber line 123 by the circulator 116. After passing through the optical fiber line 123, the multiplexed downstream signals are input to an optical MUX/DMUX 131 of the RN. Then, the MUX/DMUX 131 demultiplexes the downstream signals based on the wavelengths of the downstream signals, and the demultiplexed downstream signals are respectively transmitted to $ONT_1$ 150-1 through $ONT_N$ 150-N of an ONT 150 through optical fiber lines 140.

In a given $ONT_i$ 150$i$, the downstream signal is transmitted both to an RSOA 151 and a second receiver by a coupler 154. The RSOA 151 remodulates the downstream signal to generate an upstream signal, and the second receiver 152 demodulates the downstream signal. Upstream signals output from RSOAs 151 are transmitted to the MUX/DMUX 131 of the RN 130 through the optical fiber lines 140, and then the MUX/DMUX 131 optically multiplexes the upstream signals and transmits the multiplexed upstream signals to the OLT 110 through the optical fiber line 123. In the OLT 110, the circulator 116 directs the upstream signals to an optical DMUX 114, and the DMUX 114 demultiplexes the upstream signals into first receivers 112-1 through 112-N based on the wavelengths of the upstream signals. The first receivers 112-1 through 112-N demodulate the upstream signals.

Figure 3:
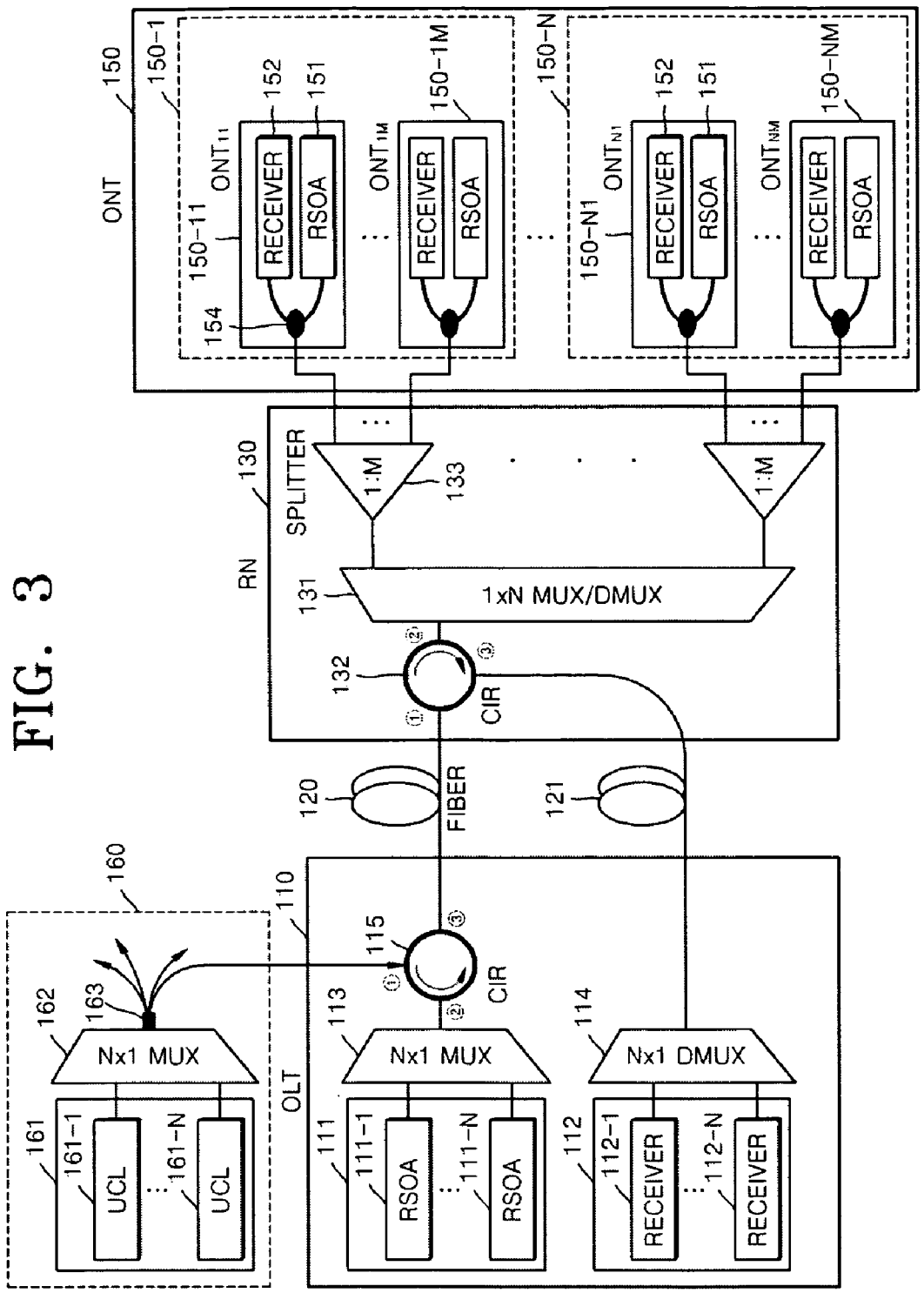
FIG. 3 is a schematic block diagram illustrating a PON having a structure similar to that of the PON illustrated in FIG. 1 except for additional optical splitters for time division multiple access (TDMA) communication according to another embodiment of the present invention.

FIG. 3 is a schematic block diagram illustrating a WDM-PON having a structure similar to that of the WDM-PON illustrated in FIG. 1 except for additional optical splitters for time division multiple access (TDMA) communication according to another embodiment of the present invention.

Referring to FIG. 3, the WDM-PON of the current embodiment has a structure similar to that of the WDM-PON illustrated in FIG. 1 except that the WDM-PON is constructed to use a TDMA communication scheme. That is, an RN 130 of the WDM-PON of the current embodiment includes a circulator 132, an optical MUX/DMUX 131, and optical splitters 133 having a splitting ratio of 1:M.

The 1:M splitting ratio of the optical splitters 133 can be determined in consideration of a power budget for the overall optical link. The MUX/DMUX 131 demultiplexes downstream signals based on the wavelengths of the downstream signals, and each of the demultiplexed downstream signals is transmitted to M subscribers by the splitter 133. In the current embodiment, for example, when a wavelength multiplexing ratio is 1:N, a total of N×M subscribers can be connected to the WDM-PON owing to the splitters 133 having a 1:M splitting ratio. That is, the number of subscribers of the WDM-PON can be significantly increased.

Each of the downstream signals transmitted through splitters 133 and the optical fiber lines 140 is sent both to an RSOA 151 and to a second receiver by a coupler 154. Then, in the same manner as in the embodiment illustrated in FIG. 1, the RSOA 151 remodulates the downstream signal to generate an upstream signal, and the second receiver 152 demodulates the downstream signal. However, in the current embodiment, since the splitter 133 transmits downstream signals to the second receivers 152 of M subscribers according a TDMA communication scheme, each subscriber extracts its signal from the downstream signals sent by the splitter 133. Furthermore, upstream signals generated by RSOAs 151 of $ONT_{11}$ through $ONT_{1M}$ are transmitted to a first receiver 112 of an OLT 110 by using their own time slots. Therefore, an upstream signal of a subscriber can be transmitted to the first receiver 112 without interference with other upstream signals of the other M−1 subscribers.

The upstream signals output from the M RSOAs 151 via M subscriber channels are multiplexed by the splitters 133 using a TDMA scheme and further optically multiplexed by the MUX/DMUX 131 into the circulator 132. The circulator 132 directs the multiplexed upstream signals to an optical DMUX 114 of the OLT 110 through an optical fiber line 121, and the DMUX 114 demultiplexes the upstream signals based on the wavelengths of the upstream signals and transmits the demultiplexed upstream signals to first receivers 112-1 through 112-N. Here, the first receivers 112-1 through 112-N may be burst-mode optical receivers having a sufficient dynamic range for compensating for optical power differences between upstream signals of M subscribers connected to the same splitter 133. In this case, the first receivers 112-1 through 112-N can receive upstream signals regardless of difference in distances from an ONT 150 and the RN 130.

Since TDMA optical splitters are included in the WDM-PON of the current embodiment, the WDM-PON can use both the WDM and TDMA communication schemes. Therefore, the WDM-PON of the current embodiment can accommodate much more ONTs. As a result, wavelengths can be efficiently used in a high-speed optical communication environment. Meanwhile, the TDMA communication scheme is used for many Ethernet-passive optical networks (E-PONs), and technologies for the TDMA communication scheme are well developed. Therefore, the PON of the current embodiment using both the WDM and TDMA communication schemes will now be referred to as a WDM/Ethernet (WE)-PON so as to indicate that a WDM-PON and a TDMA type E-PON are combined into the PON of the current embodiment.

Figure 4:
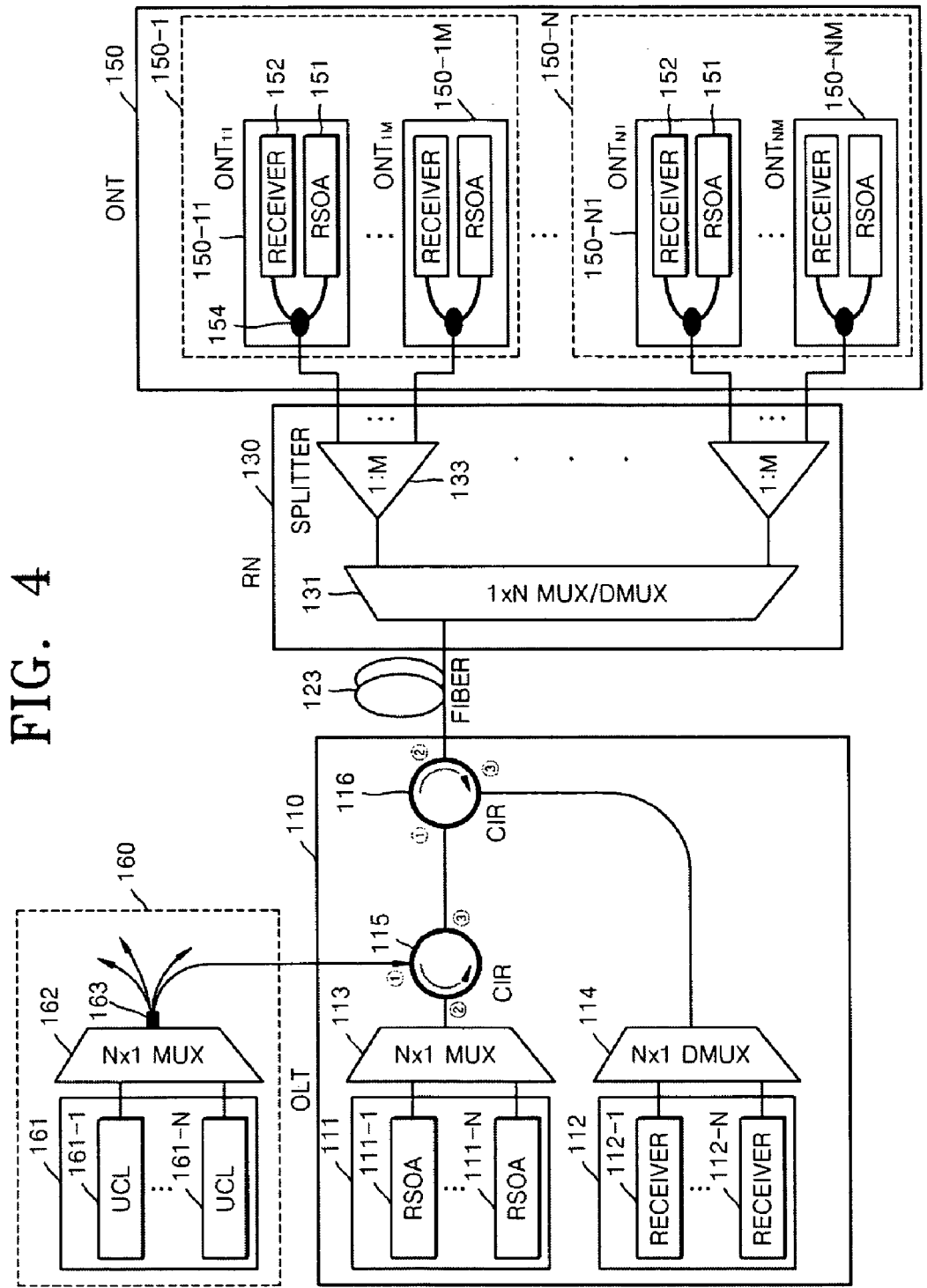
FIG. 4 is a schematic block diagram illustrating a PON having a structure similar to that of the PON illustrated in FIG. 3 except that only a single optical fiber line is used to connect a central office and an RN according to another embodiment of the present invention.

FIG. 4 is a schematic block diagram illustrating a WE-PON having a structure similar to that of the WDM-PON illustrated in FIG. 3 except that only a single optical fiber line is used to connect an OLT and an RN according to another embodiment of the present invention.

Referring to FIG. 4, the WE-PON of the current embodiment has a structure similar to that of the WDM-PON illustrated in FIG. 3 except that the WE-PON uses a single optical line for upstream and downstream to save feeder fiber lines 123, like in the embodiment illustrated in FIG. 2. That is, instead of an RN 130, an OLT 110 includes a circulator 116 for separating a downstream signal and an upstream signal. The WE-PON operates by a TDMA communication scheme in the same manner as the WDM-PON illustrated in FIG. 3, and upstream and downstream signals are transmitted through the single optical fiber line 123 in the same manner as in the embodiment illustrated in FIG. 2.

Figure 5:
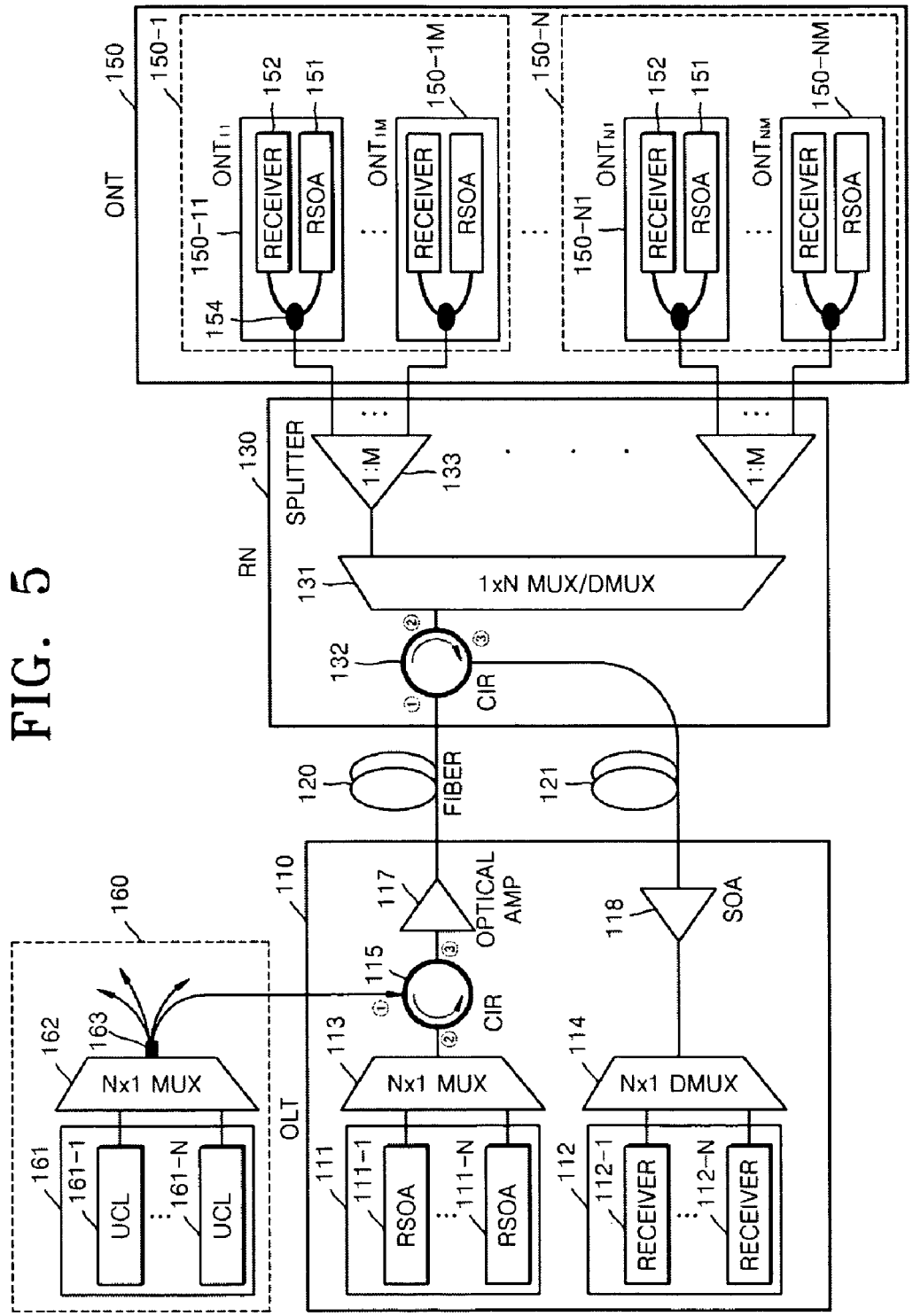
FIG. 5 is a schematic block diagram illustrating a PON having a structure similar to that of the PON illustrated in FIG. 3 except for optical amplifiers used for increasing upstream and downstream optical powers according to another embodiment of the present invention.

FIG. 5 is a schematic block diagram illustrating a WE-PON having a structure similar to that of the WDM-PON illustrated in FIG. 3 except for optical amplifiers used for increasing upstream and downstream optical powers according to another embodiment of the present invention.

Referring to FIG. 5, when upstream and downstream signals are transmitted through separate optical fiber lines like in the embodiment illustrated in FIG. 3, optical power can be reduced at an optical splitter 133 by 1/M, causing difficulties in the power budget and reducing the number of available subscribers and available power margin.

In the WE-PON of the current embodiment, these problems are solved by adding a fiber optical amplifier 117 and a semiconductor optical amplifier (SOA) 118 into an OLT 110 so as to compensate for optical power losses. Therefore, the number of available subscribers can be increased and required optical power can be ensured.

An erbium doped fiber amplifier (EDFA) can be used as the fiber optical amplifier 117. In this case, the EDFA may have a sufficiently large output saturation power for transmitting downstream signals to an ONT at a sufficient optical power level. Furthermore, the output saturation power and gain of the SOA 118 may be adjusted for linearly amplifying a number of wavelengths in a wide power range.

In the WE-PON of the current embodiment, optical amplifiers are included in the OLT so as to compensate for optical power losses of respective wavelengths caused by TDMA optical splitting. Therefore, a sufficient optical power level can be maintained for reliable optical communication even though the number of ONTs has increased. Thus, optical power can be sufficiently ensured for an optimized power budget.

Figure 6:
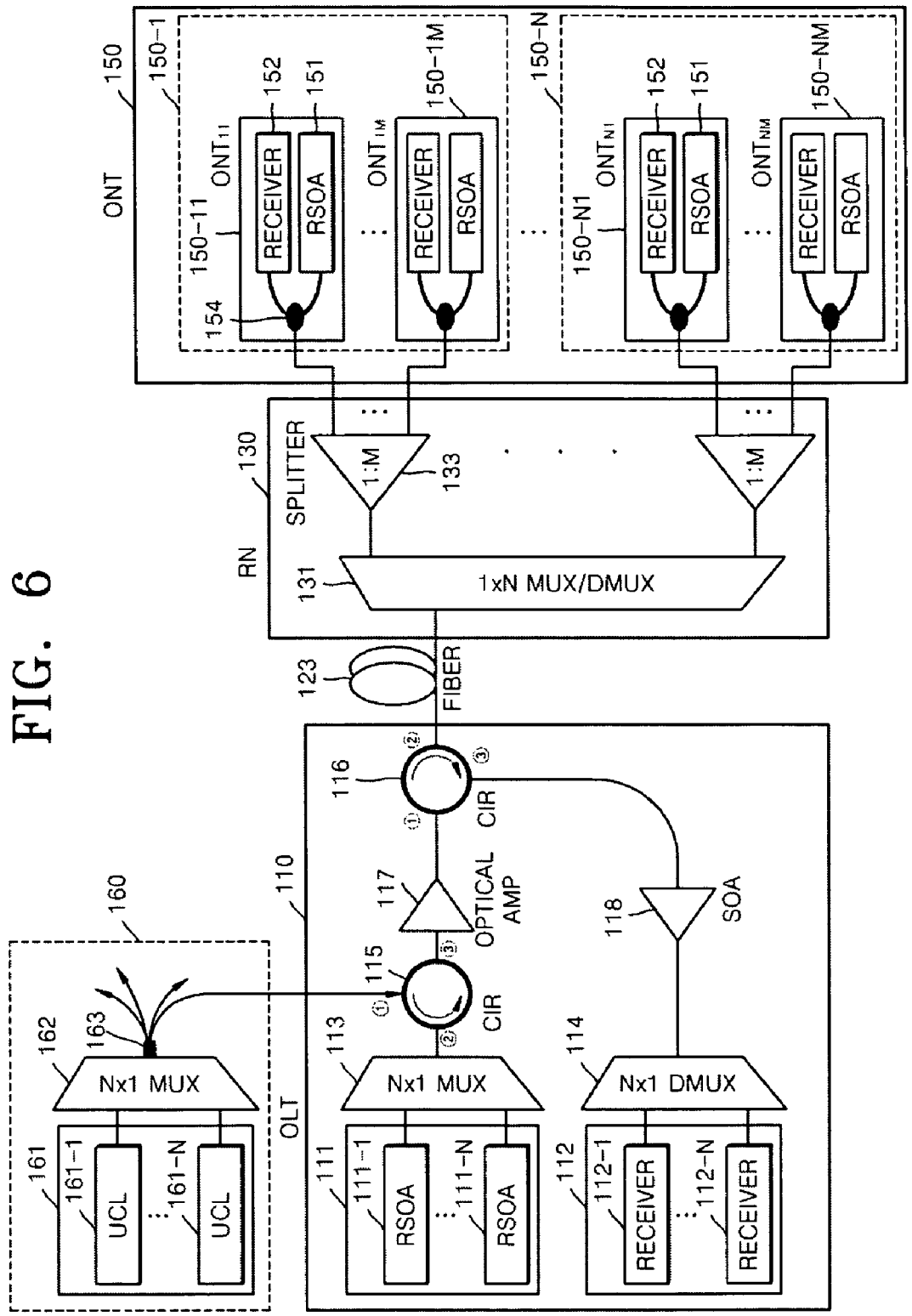
FIG. 6 is a schematic block diagram illustrating a PON having a structure similar to that of the PON illustrated in FIG. 5 except that only a single optical fiber line is used to connect a central office and an RN according to another embodiment of the present invention.

FIG. 6 is a schematic block diagram illustrating a WE-PON having a structure similar to that of the WE-PON illustrated in FIG. 5 except that only a single optical fiber line is used to connect an OLT and an RN according to another embodiment of the present invention.

Referring to FIG. 6, the WE-PON of the current embodiment has a structure similar to that of the WE-PON illustrated in FIG. 5 except that the WE-PON uses a single optical fiber line to save feeder fiber lines, like in the embodiment illustrated in FIG. 2. That is, instead of an RN 130, an OLT 110 includes a circulator 116 for separating a downstream signal and an upstream signal. The WE-PON operates by a TDMA communication scheme in the same manner as the WDM-PON illustrated in FIG. 3, and upstream and downstream signals are transmitted through the single optical fiber line 123 in the same manner as in the embodiment illustrated in FIG. 2. Furthermore, optical amplifiers 117 and 118 are used to amplify upstream and downstream signals in the same manner as in the embodiment illustrated in FIG. 5.

As described above, the RSOA based PON of the present invention provides the following advantages.

In the WDM-PON based on the wavelength-reuse type RSOAs, the color-less management for the wavelengths of the OLT as well as those of the ONT can be economically achieved. Therefore, service providers can easily construct and manage optical networks.

Furthermore, seed-light-injection RSOAs are used as downstream optic sources of the OLT, and inexpensive TO- CAN type DFB-LDs (i.e., UCLs) are used for providing light to the RSOAs instead of butterfly type DFB-LDs. Therefore, optical networks can be more economically constructed.

Moreover, the RSOA based WDM-PON uses the TDMA communication scheme as well as the WDM communication scheme. That is, a WE-PON is realized. Therefore, the number of subscribers, which is determined by the number of ports of the WDM MUX/DMUX and the number of wavelengths of the optic sources, can be increased by M times by using optical splitters having a 1:M splitting ratio.

In addition, fiber and semiconductor optical amplifiers can be included in the OLT of the WE-PON so as to ensure sufficient optical power for transmitting upstream and downstream signals, thereby increasing network reliability and the number of subscribers to be accommodated in the network.

The invention can also be embodied as computer-readable codes on a computer-readable recording medium. The computer-readable recording medium is any data storage device that can store data which can be thereafter read by a computer system. Examples of the computer-readable recording medium include read-only memory (ROM), random-access memory (RAM), CD-ROMs, magnetic tapes, floppy disks, optical data storage devices, and carrier waves (such as data transmission through the Internet). The computer-readable recording medium can also be distributed over network-coupled computer systems so that the computer-readable code is stored and executed in a distributed fashion. Also, functional programs, codes, and code segments for accomplishing the present invention can be easily construed by programmers skilled in the art to which the present invention pertains.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A PON (passive optical network) based on an RSOA (reflective semiconductor optical amplifier) for color-less management of wavelengths an OLT (optical line terminal) and an ONT (optical network terminal), the PON comprising:
    an OLT comprising seed-light-injection RSOAs as optic sources for transmitting downstream signals and first receivers receiving upstream signals, wherein the seed-light-injection RSOAs receive seed light from UCLs (utility-cooled lasers);
    ONTs comprising second receivers receiving the downstream signals and RSOAs transmitting upstream signals by remodulating the downstream signals; and
    an RN (remote node) relaying signals between the OLT and the ONTs.

2. The PON of claim 1, wherein the seed-light-injection RSOAs are based on a TO-CAN type DFB-LD (distributed feedback laser diode).

3. The PON of claim 2, wherein light output from the UCLs is multiplexed by an optical MUX (multiplexer) and is input to the respective seed-light-injection RSOAs through a seed-light circulator and an optical MUX included in the OLT.

4. The PON of claim 3, wherein the light output from the UCLs is distributed by an optical splitter installed in front of the optical MUX, such that at least two OLTs share the light output.

5. The PON of claim 1, wherein upstream and downstream signals are transmitted between the OLT and the RN, through upstream and downstream optical fiber lines, respectively.

6. The PON of claim 5, wherein the OLT further comprises an optical MUX multiplexing downstream signals from the seed-light-injection RSOAs and an optical DMUX (demultiplexer) demultiplexing upstream signals from the ONTs to the first receivers, and
    the RN comprises a circulator separating upstream and downstream signals and an optical MUX/DMUX.

7. The PON of claim 1, wherein the OLT and the RN communicate with each other using a single optical fiber line.

8. The PON of claim 7, wherein the OLT further comprises an optical MUX multiplexing downstream signals from the seed-light-injection RSOAs, an optical DMUX demultiplexing upstream signals from the ONTs to the first receivers, and
    a circulator separating upstream and downstream signals, and the RN comprises an optical MUX/DMUX.

9. The PON of claim 1, wherein the RN comprises:
    an optical MUX/DMUX; and
    TDMA (time division multiple access) optical splitters connected between ports of the optical MUX/DMUX and the ONTs.

10. The PON of claim 9, wherein the optical splitters have a splitting ratio of 1:M, and the number of ONTs increases by M times owing to the optical splitters.

11. The PON of claim 9, wherein the first receivers of the OLT are burst-mode receivers each capable of receiving the upstream signals regardless of difference in the distances between the ONTs and the RN.

12. The PON of claim 9, wherein the OLT further comprises an optical MUX multiplexing downstream signals from the seed-light-injection RSOAs, an optical DMUX demultiplexing upstream signals from the ONTs to the first receivers, and
    a circulator separating upstream and downstream signals, and the OLT and the RN communicate with each other using a single optical fiber line.

13. The PON of claim 9, wherein the OLT further comprises:
    an optical MUX multiplexing downstream signals from the seed-light-injection RSOAs; and
    an output optical amplifier increasing output power of the optical MUX.

14. The PON of claim 13, wherein the output optical amplifier is an EDFA (erbium doped fiber amplifier) having a predetermined saturation output power or an SOA (semiconductor optical amplifier) having a predetermined saturation output power and linear gain.

15. The PON of claim 9, wherein the OLT further comprises:
    an optical DMUX demultiplexing upstream signals from the ONTs to the first receivers; and
    a reception optical amplifier increasing power of input signals of the optical DMUX.

16. The PON of claim 15, wherein the reception optical amplifier is an EDFA having a predetermined saturation output power or an SOA having a predetermined saturation output power and linear gain.

17. The PON of claim 15, wherein the OLT further comprises
    a circulator separating downstream and upstream signals, and the OLT and the RN communicate with each other using a single optical fiber line.

18. The PON of claim 9, wherein the OLT further comprises:
- an optical MUX multiplexing downstream signals from the seed-light-injection RSOAs;
- an output optical amplifier increasing output power of the optical MUX
- an optical DMUX demultiplexing upstream signals from the ONTs to the first receivers; and
- a reception optical amplifier increasing power of input signals of the optical DMUX.

19. The PON of claim 18, wherein each of the output and reception optical amplifiers is an EDFA having a predetermined saturation output power or an SOA having a predetermined saturation output power and linear gain.

20. The PON of claim 18, wherein the OLT further comprises a circulator separating upstream and downstream signals, and the OLT and the RN communicate with each other using a single optical fiber line.

* * * * *